Sept. 16, 1930.  W. C. ROBINSON  1,776,195
CONDUIT AND ELECTRICAL DISTRIBUTION SYSTEM
Filed Feb. 9, 1929  2 Sheets-Sheet 1
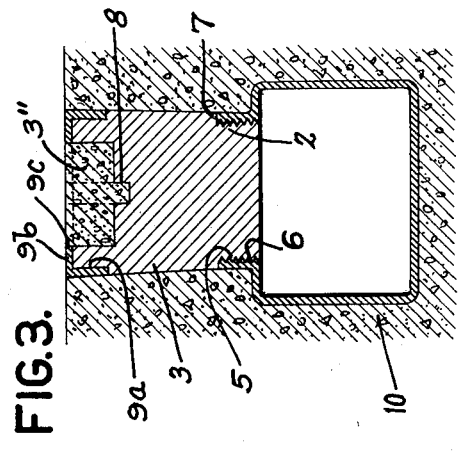
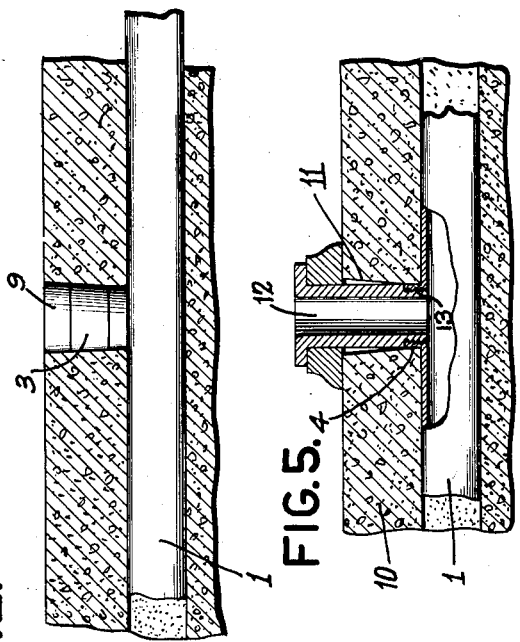
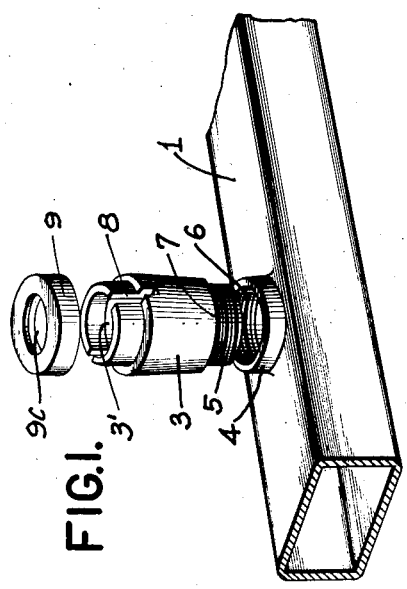
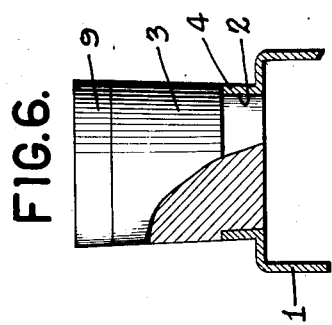
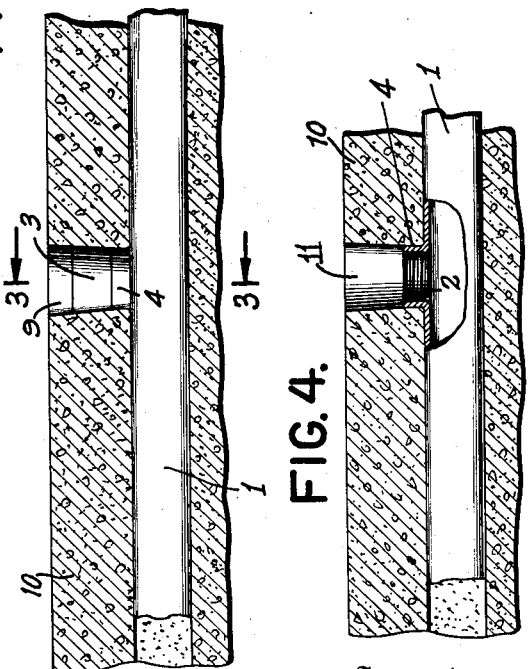
Inventor
William C. Robinson
By his Attorneys
Cooper, Kerr & Dunham Sept. 16, 1930.  W. C. ROBINSON  1,776,195
CONDUIT AND ELECTRICAL DISTRIBUTION SYSTEM
Filed Feb. 9, 1929  2 Sheets-Sheet 2
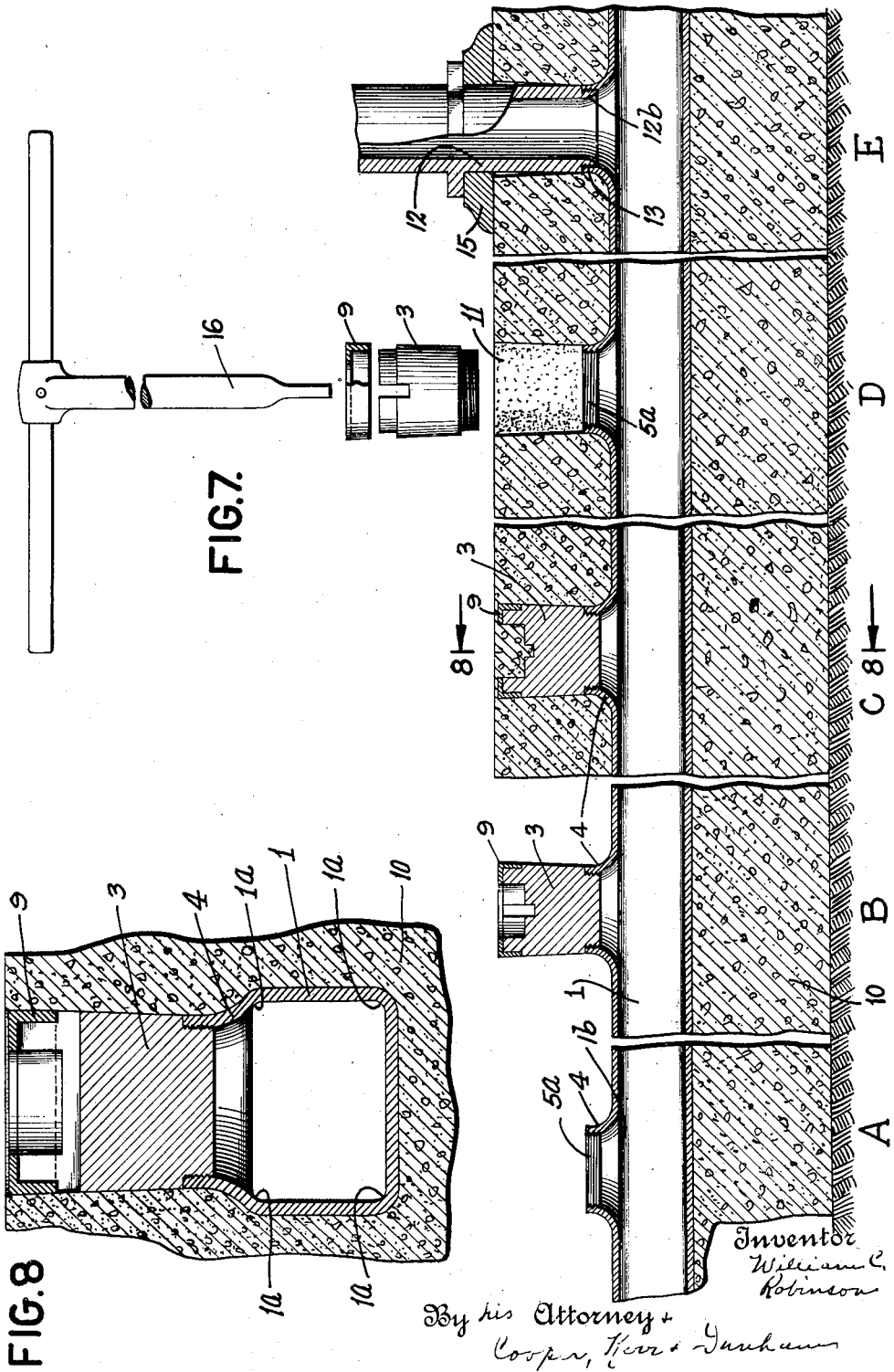
Inventor
William C. Robinson
By his Attorney +
Cooper, Kerr & Dunham Patented Sept. 16, 1930

1,776,195

UNITED STATES PATENT OFFICE

WILLIAM C. ROBINSON, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

CONDUIT AND ELECTRICAL DISTRIBUTION SYSTEM

Application filed February 9, 1929. Serial No. 338,667.

In buildings and other structures having concrete floors or walls, it has of recent years, become more or less a practice to embed conduits or ducts for electrical wiring systems within the floors and walls to provide outlets for making electrical connections with the conductors contained in the conduits or ducts. In some such systems, the surfaces of the conduits or ducts have been exposed through the floor surface and in other such systems the conduits or ducts have been buried beneath the floor surface at a considerable depth requiring rather deep drilling through the concrete and into the ducts or conduits to make electrical connections. Such drilling of the concrete, of the conduits or ducts is somewhat expensive and entails more or less injury to the concrete surrounding the passages formed therein, sometimes requiring cementing around the passages to restore a proper condition of a floor or wall after bushings or other fittings have been passed through the openings in the concrete and connected with the conduits.

Another system proposed includes the attachment to the conduits of so-called tubular inserts spaced at pre-determined uniform intervals along the conduits prior to installation of the same in the floor or wall structure, and when the conduits having such inserts are being installed the concrete of the floor has been brought up to the level of the outer ends of the inserts. In use, the separate inserts form obstructions upon the inside of the ducts and hinder free fishing of the conductors therethrough. They also provide abrupt right angled bends for the wires which are drawn from the duct through the insert to the floor surface.

With an insert construction, light gauge metal must be employed in order that the inserts may be engaged with the duct by flanging or crimping and with such a type of connection, the electrical grounding connection from the duct proper to the floor outlet is questionable and uncertain.

Heretofore, such underfloor duct systems have also employed conduit or duct having a rectangular cross-section with relatively square corners. Such a duct when installed under a floor tends to cause voiding and cracking of the overlying concrete at the corners of the ducts.

The invention has for its objects the provision of an improved construction which will obviate the aforesaid objectionable characteristics of systems now in use.

A further object of my invention is to provide a conduit or duct suitable for an electrical distribution system provided with openings for service outlets spaced at desired intervals along the conduit or duct, but the use of inserts at such openings extending to the floor surface is dispensed with and I provide plugs in said openings which will serve to close the same and to be buried in the concrete of the floor or wall structure when the conduits or ducts are buried at a suitable distance beneath the surface of the floor structure and with the outer ends of the plugs extending substantially at or preferably flush with the floor or slightly below the finished floor surface.

When it is desired to make a connection with a conductor within the conduit or duct, it is merely necessary to remove the desired plug from the conduit itself and from the space it occupied within the concrete flooring, thereby affording a pre-formed passage in the concrete communicating with the opening in the conduit or duct through which opening the desired electrical connection may be made.

For facilitating fishing of the wires through and from the duct, the duct adjacent each opening may be provided with an integral neck portion which merges with the interior of the duct with sweeping curves so that wires may be readily pulled through the duct or from the ducts through the openings. The construction of these neck portions integrally with the material of the duct also affords direct mechanical and electrical connection with the duct for the reception of a service connection extension which may be threaded to receive the threads in the opening which previously received the plug. The plugs may be of wood, metal or other suitable material and are of such configuration that they may be readily removed from the duct and from the floor without any drilling or without extensive drilling of such floor and such plugs are comparatively cheap, and the presence of a considerable number of them will not add materially to the cost of the conduit.

Another object of the invention resides in the provision of a duct system with ducts or conduits having a general rectangular configuration in contradistinction to arched ducts as heretofore used which arched ducts having objectionable acute corners thereon and furthermore the rectangular ducts are provided with somewhat sweeping corner portions whereby voiding or cracking of the overlying concrete material is obviated. Furthermore, such configuration of the ducts makes the same more economical to produce as the material is more efficiently utilized and in addition the sweeping curved corner portions are adapted to smoothly merge into the integral outlet necks and thus not only facilitate the formation of the integral necks, but also ultimately facilitating the fishing of the wires into the necks through the outlet openings and into the extensions.

Another object of the invention resides in the provision of a duct having a construction and configuration which is easier and more economical to manufacture than heretofore, and in which the metal of duct has not become crystallized and therefore not become weakened in the process of manufacture, and also to provide a construction of duct which is more economical in the maintenance of the tool equipment which is used for the manufacture of the ducts.

Other objects of the present invention reside in the provision of a construction which provides for the rigid and direct support of an extension by the conduit itself and which will also provide a direct and certain ground connection between the conduit and extension instead of the uncertain ground connection heretofore obtained with constructions employing a multiplicity of fittings and adaptors with enamel interposed between the fittings and duct and adaptors.

Other objects and advantages will be hereinafter set forth in the accompanying specification and claims and shown in the drawings, which show certain preferred embodiments of the invention.

In the drawings:

Figure 1 is a detail perspective view illustrating my improved conduit and its parts separated;

Fig. 2 is a longitudinal section through a floor structure illustrating my improvements in position;

Fig. 3 is an enlarged cross-section on line 3—3 in Fig. 2;

Fig. 4 is a detail section illustrating the passage in the concrete flooring when the plug is removed;

Fig. 5 is a detail section illustrating the conduit in the flooring and a bushing attached to the conduit and located within the pre-formed passage in the flooring left by the removal of the plug therefrom;

Fig. 6 is a modification; and

Figs. 7 and 8 show another slightly modified arrangement, Fig. 7 being a transverse sectional view and Fig. 8 being a cross-sectional view taken on line 8—8 of Fig. 7. Fig. 8 in particular shows the rectangular duct configuration with sweeping corners which directly merge with the outlet necks and Fig. 7 shows the manner in which the sweeping curves of the outlets merge longitudinally with the duct material.

The conduit 1 may be of any desired or well known construction used in underfloor systems of electrical distribution. At suitable spaced intervals at least one wall of the conduit is provided with outlet openings 2 through which branch connections may be made with electrical conductors within the conduit. The outlet openings 2 are closed by means of plugs 3, which plugs may be of wood or metal or any other suitable relatively cheap material. By preference the conduit is provided with a relatively short integral neck or projection 4 which may be formed by pressing out the metal of the conduit wall so that the neck will surround the outlet 2 and provide a means of attachment of the plug 3 to the conduit. The plug 3 may be threaded at the inner end at 5 to engage threads 6 formed within the neck 4, so that the plug may be screwed to the neck to seal the corresponding openings 2 in the conduit. Above the threaded portion 5 the plug is shown provided with a shoulder 7 to bear against the outer edge of neck 4 to make a close fit, such shoulder and the threads preventing concrete from entering the conduit when the conduit is laid in concrete or cement flooring. Instead of providing threads in the neck 4 and on the plugs the plugs may be driven in the necks with a friction fit, as in Fig. 6. The outer end of plug 3 may be provided with a transverse slot 8 for use of a screw driver or other implement, particularly for unscrewing the plug from the neck. At 9 is a ferrule for plug 3, which ferrule has a flange 9$^a$ fitted around the outer end of plug 3, the outer portion 9$^b$ of the ferrule resting upon the end of the plug. The ferrule is shown provided with an opening 9$^c$ registering with a depression 3' in the plug, in which opening and depression cement 3" may be filled to the ferrule surface or slightly above it, thereby limiting the area of the metal ferrule subject to vision. The ferrule 9 will protect the plug against injury from contact of objects when the parts are embedded in a flooring or from splitting.

When a conduit is to be embedded in a flooring 10 the conduit may be rested upon a lower or rough slab of the floor or on suitable seats in a well known way with the several spaced plugs fitted in the openings 2 of the conduit, the latter being so laid that the tops of the plugs or their ferrules will be flush with the finished surface of the floor and with the concrete or cement properly laid around the plugs and their ferrule to make substantially tight fits therebetween, as illustrated in Fig. 2. The openings 2 with their plugs suitably spaced along the conduit provide means to permit connection to be made at any of the outlet openings 2 for branch connection to fixtures, motors and the like. When it is desired to make a branch connection with an electrical conductor installed within a conduit the appropriate plug 3 and its ferrule are removed from the conduit, as by unscrewing the plug from the latter and withdrawing it from the concrete, leaving a pre-formed passage 11 in the latter in communication with the corresponding outlet opening 2 of the conduit, as illustrated in Fig. 4. If the plug should not readily unscrew from the conduit and the passage 11 it will be a simple matter to drill or break out the plug without having to drill or chip the concrete or cement of the flooring, so that the passage 11 in the latter can be quickly opened without injury to the concrete by merely removing the plug. The tapering configuration of the plug, however, usually makes it a simple matter to remove the plugs from the surrounding concrete material. After the plug has been removed from the concrete any suitable tubular fitting or bushing, indicated at 12 in Fig. 5, may be inserted through the passage 11 and by means of threads 13 upon the inner end of the fitting the latter may be screwed to the threads in neck 4 for securely retaining the fitting attached to the conduit with the outer end of the fitting substantially above the floor surface, so that conductors may be drawn through the fitting without injury.

My improvement affords a relatively cheap means of supplying conduits for an electrical distribution system having outlet openings in the walls positioned for making branch connections and without requiring the conduits to be drilled for such purpose, with cheap plugs located in such openings to be removed inexpensively to provide access to such openings through the flooring without cutting the flooring and with resultant cheapness in construction and installation, since only the fitting or bushing 12 that is to be used for a branch connection is required to be provided, the plugs 3 being a great deal cheaper than such fittings and affording relatively solid means for plugging the preformed passages 11 in the flooring that are not required for branch connections.

My improved conduits may be installed in a system of underfloor electrical distribution and connected with outlet boxes, fittings and the like in any well known way, so that when branch connections are to be made from any part of the system it will merely be necessary to remove the desired plug or plugs to permit access to the conductor or conductors within the conduits through the pre-formed passages in the floor structure while other plugs remain in the floor for removal at any time.

According to the embodiment of the invention shown in Figs. 7 and 8 the conduit 1 has a substantially rectangular cross-section but in place of having relatively square or only slightly rounded corners as heretofore, the conduit at the corners is provided with somewhat sweeping curved portions 1$^a$. The necks 4 which are integral with the conduits also have sweeping curves so that the inside of the necks merges without any abrupt bends or shoulders with the interior of the upper wall of the conduit or duct and also at the sides with the interior of the sweeping curved portions 1$^a$. This construction provides a spacious conduit free from objectionable acute angles or corners either in the main part of the conduit itself or in the necks and thus facilitates the fishing of wires and conductors through the conduits and necks. The rectangular configuration of the conduit also is advantageous in that it minimizes the height of the floor construction which is required to embed and conceal the conduit while at the same time permitting the maintenance of a desired amount of concrete above the conduits which is required to produce a solid construction. The construction of the necks also permits terminating the threads 5$^a$ of the necks substantially above the plane 1$^b$ which is the inside and top of the conduit. Accordingly, the bottoms of the plugs 3 when applied to the conduit are above this plane 1$^b$ and likewise the surface extensions 12 when applied have their lower ends substantially above this plane 1$^b$. By providing this construction the plugs or the engagement of the extensions do not form an obstruction or construction of the full area of the wire raceway. Preferably the inner lower ends of the extensions 12 are bevelled or curved as shown at 12$^b$ so that when an extension is applied the inside of the curve 12$^b$ merges with the curves of the necks and thus facilitates the fishing of the wires into the extensions inasmuch as shoulders and projections are obviated. The integral neck construction also affords a rigid support for the applied extensions since the extension connects directly with the conduit itself and by so connecting the extensions a good ground connection is established between the extension and conduit. It is important that such protective grounding connection be positive and in nowise uncertain as has heretofore been the case with insert constructions in which the insert is of light gauge metal which is secured to the duct by flanging or bending and in which not only is there a doubtful ground connection between the duct and insert, but in which there are also uncertain ground connections between the insert and extension.

According to the present invention, the extension is rigidly held by the conduit itself and a proper and direct ground connection is made through the threads 5ª and 13.

In Figs. 5 and 7, I have shown a covering plate 15 which is adapted to cover the opening 11 which is around the periphery of the tubular extension 12.

Fig. 7 illustrates successive steps in installation. At A the conduit is shown in place with the necks 4 thereon ready to receive the plugs. At B the plugs 3 are shown installed. At C the concrete fill is shown as disposed around the plugs or necks and in this figure the surface line of the concrete is shown as disposed slightly over the top flanges 9ᵇ of ferrules 9. If the concrete covers the ferrules the location of the ferrules and plugs may be determined by measurement from records or in certain cases the ferrules may be close enough to the surface of the concrete to appear as dark spots therein and thereby provide markers for the "spotting" of the ferrules and the plugs. It is obvious, of course, that the flanges 9ᵇ could be flush with the finished floor line as shown in Fig. 3. After the C step and when the desired connection is to be established, the workman first chips off any overlying concrete material and also chips out the concrete 3″ from the interior of the plug so that access may be had to slot 8 for the application of a removing wrench or screw driver 16. The desired plug or plugs are then removed as shown at D, leaving the pre-formed opening 11 in the concrete 10.

The next step is the application of the service extension as shown at E.

In conclusion, it may be stated that the configuration of the ducts 1, the necks 4, the disposition of the plugs 3 and the configuration and disposition of the extensions 12 is such that free fishing of the conductors through the conduits and in and out of the necks and through the extensions is afforded. Shoulder projections are obviated at all points and the conduit itself contains no pockets or acute corners wherein the conductors might bend, catch or become damaged in the fishing operation. Also the material of the ducts is most efficiently utilized and voiding or the tendency of the concrete to crack is obviated.

The completed duct installation also forms a good ground return inasmuch as the necks are integral with the ducts and relatively long and continuous lengths of duct material can be utilized.

The present application constitutes an application which is a continuation in part of my copending application Serial No. 268,415, filed April 9, 1928.

It will be understood that the improved conduit herein described can also be used in side walls with the integral necks extending horizontally, or the conduits may be used in ceilings with the necks extending downwardly. Broadly it is immaterial where the particular conduit is used. It can be used in any partition member such as in a floor, side wall partition or ceiling partition.

What I now claim is:

1. A conduit for a system of electrical distribution provided with spaced outlet openings, and plugs detachably fitted in said openings, said plugs extending from the conduits in position to provide pre-formed passages in a floor structure communicating from the floor surface with the outlets in the conduits when the plugs are removed therefrom.

2. A conduit as set forth in claim 1, provided with a neck receiving the plug.

3. A conduit as set forth in claim 1, provided with a threaded neck, the plug having threads to engage the threaded neck.

4. A conduit for a system of electrical distribution provided with spaced outlet openings, plugs detachably fitted in said openings, said plugs extending from the conduits in position to provide pre-formed passages in a floor structure communicating from the floor surface in the conduits when the plugs are removed therefrom, and ferrules surrounding the ends of the plugs to protect the latter.

5. A conduit as set forth in claim 4, in which the plugs are provided with depressions at their outer ends, the ferrules having openings communicating with said plugs, and a filler within said depressions and openings.

6. In a system of electrical distribution, a floor, a conduit embedded in the floor below its surface, said conduit having spaced outlet openings, and plugs detachably fitted at said openings in the floor providing pre-formed passages in the floor adapted to communicate from the floor surfaces to the openings in the conduit when the plugs are removed from the passages.

7. A conduit for a system of electrical distribution comprising a conduit of substantially rectangular configuration and provided with spaced outlet openings and including integral neck portions which terminate comparatively closely to the conduit and plugs detachably fitted in said necks, said plugs extending from said necks in position to provide pre-formed passages in a floor structure, communicating from the floor surface with the outlets in the conduits when the plugs are removed therefrom.

8. A conduit for an electrical distribution system provided with a number of necks formed integrally with the conduit and having inner screw threads adapted to alternatively receive plugs which serve to form preformed openings in concrete and which may be selectively removed, or to receive outlet extensions, each said extension being threaded to fit the neck, said neck having interior curves adapted to substantially merge with the inner curved portion of the extension to thereby afford free fishing of the conductors from the conduit into the extension.

9. A conduit for an electrical distribution system provided with spaced outlet openings and integral interiorly threaded neck portions upon said conduit and plugs threaded to engage interiorly said necks, said plugs having provisions affording means for preventing ingress of concrete into the threads of said necks, and said plugs extending from the conduits in position to form pre-formed passages in a floor structure communicating from the floor surface with the outlets in the conduits when the plugs are removed therefrom.

10. A concealed electrical distribution system for poured building structures comprising a poured slab, a conduit wholly embedded in the slab at a substantial distance from the slab surfaces, plugs removably attached to a wall of the conduit, and extending from the wall to a surface of the slab, the plugs being so shaped as to facilitate their removal, intact from the structure after the material of the slab has set.

11. A concealed electrical distribution system for poured building structures comprising a poured slab, a conduit wholly embedded in the slab at a substantial distance from the slab surfaces, plugs removably attached to a wall of the conduit, and extending from the wall to a surface of the slab, the plugs being so shaped as to facilitate their removal, intact from the structure after the material of the slab has set and ferrules surrounding the ends of the plugs flush with the slab surface.

12. An electrical distribution system including in combination, a metallic conduit provided with laterally opening outlet necks which are integral with the metal of the conduit, plug-shaped forms attachable to and detachable from said necks for providing access openings to said necks after the conduit has been installed, and service extension fittings each insertable through an access opening after the removal of the corresponding form and directly attachable to the corresponding neck by a single mechanical and electrical ground joint between the fitting and the neck.

13. An electrical distribution system including in combination, a one piece metallic conduit provided with laterally opening plug receiving and service extension fitting attaching necks which are integral with the metal of the conduit, removable plug-shaped forms for said necks, service extension fittings each insertable through an access opening after the removal of the corresponding plug and directly attachable to the corresponding neck by a single mechanical and electrical ground joint between the fitting and the neck, each of said necks being longitudinally curved throughout the major portion of its length to form substantially smooth longitudinal curves from the zone at which the neck integrally merges with the first mentioned conduit to the zone directly adjacent the end of the service extension fitting when attached to the neck.

14. A one piece metallic conduit having necks struck up from the metallic wall of the conduit itself and forming laterally extending passages having curved walls which are integral extensions of the wall of the conduit itself, the said necks integrally merging with the metal wall of the conduit itself, the curved interior wall of each neck tangentially joining with the inner surface of the conduit wall longitudinally of the conduit whereby wire obstructions adjacent the necks are obviated, and the interior of said necks being screw-threaded directly to receive a metallic service-extension fitting and to form with each said fitting a single ground joint between the fitting and the one-piece wall of the conduit itself.

In testimony whereof I hereto affix my signature.

WILLIAM C. ROBINSON.